(12) United States Patent
Kubota

(10) Patent No.: US 8,335,041 B2
(45) Date of Patent: Dec. 18, 2012

(54) HEAD MOUNTED DISPLAY

(75) Inventor: Takehiko Kubota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 58 days.

(21) Appl. No.: 13/105,487

(22) Filed: May 11, 2011

(65) Prior Publication Data

US 2011/0292513 A1    Dec. 1, 2011

(30) Foreign Application Priority Data

May 25, 2010 (JP) ................................. 2010-119041

(51) Int. Cl.
*G02B 27/14* (2006.01)
(52) U.S. Cl. ....................................... 359/630; 359/629
(58) Field of Classification Search .................. 359/629, 359/630
See application file for complete search history.

(56) References Cited

U.S. PATENT DOCUMENTS

2011/0292513 A1 * 12/2011 Kubota ........................ 359/630

FOREIGN PATENT DOCUMENTS

| JP | A-2001-209004 | 8/2001 |
| JP | A-2001-522477 | 11/2001 |
| JP | A-2007-524856 | 8/2007 |
| WO | WO 99/39237 | 8/1999 |
| WO | WO 2005/062105 A1 | 7/2005 |

* cited by examiner

*Primary Examiner* — William Choi
(74) *Attorney, Agent, or Firm* — Oliff & Berridge, PLC

(57) ABSTRACT

A head mounted display includes a display unit, a concave mirror, an optical unit that is arranged between the display unit and the concave mirror, transmits a part of incident light from the display unit and reflects the other part of the incident light from the display unit, a first optical system that guides light reflected by the concave mirror to the left eye, and a second optical system that guides light reflected by the optical unit to the right eye. In the head mounted display, on the concave mirror, a right end is closer to the display unit in comparison with a left end. Further, the curvature of the concave mirror at the right end is larger than the curvature of the concave mirror at the left end.

3 Claims, 3 Drawing Sheets

HEAD MOUNTED DISPLAY

BACKGROUND

1. Technical Field

The present invention relates to a head mounted display to be mounted on user's head.

2. Related Art

An existing head mounted display (hereinafter, referred to as "HMD") includes a display for the left eye and a display for the right eye. Therefore, it is difficult to reduce the head mounted display in size. In JP-T-2001-522477, JP-A-2001-209004, and JP-T-2007-524856, HMDs which can project an image for the right and left eyes with one display are described. Any of the HMDs described in JP-T-2001-522477 and JP-A-2001-209004 display an image for the left eye (or right eye) on an upper half of one display and an image for the right eye (or left eye) on a lower half thereof. Accordingly, in order to ensure resolution, the number of dots in the vertical direction needs to be increased. That is to say, although the number of displays is reduced, reduction of the HMD in size can barely be achieved.

The HMD described in JP-T-2007-524856 is an HMD which projects the same image for the right and left eyes. The HMD described in JP-T-2007-524856 splits one image displayed on one display by one half mirror (splitting mirror) so as to project the image for the right and left eyes. Accordingly, reduction in size can be achieved at some degree without sacrificing the resolution.

However, in the HMD described in JP-T-2007-524856, light from the display is focused by a biconvex lens (display optical system 115) to reach the half mirror. Accordingly, it is necessary that the display and the half mirror be arranged so as to be sufficiently distanced from each other. That is to say, it is difficult to sufficiently reduce the HMD in size. Further, in order to employ the above configuration, the biconvex lens and the half mirror need to be arranged with high accuracy. Therefore, the HMD is not easily manufactured.

SUMMARY

An advantage of some aspects of the invention is to provide an HMD which is easily manufactured and is sufficiently reduced in size.

A head mounted display according to an aspect of the invention includes: a display unit that displays an image; a concave mirror that has a first end which is closer to one eye rather than to the other eye and a second end which is closer to the other eye rather than to the one eye; an optical unit that is arranged between the display unit and the concave mirror, and transmits a part of incident light from the display unit and reflects the other part of the incident light from the display unit; a first optical system that guides light reflected by the concave mirror to the other eye; and a second optical system that guides light reflected by the optical unit to the one eye. In the head mounted display, the first end is closer to the display unit in comparison with the second end; a curvature of the concave mirror at the first end is larger than a curvature of the concave mirror at the second end; the optical unit includes a transparent base body that has a first convex surface at the side of the display unit and a second convex surface at the side of the concave mirror, and a semi-transmissive layer that covers the second convex surface; the second convex surface has a third end which is closer to the one eye rather than to the other eye and a fourth end which is closer to the other eye rather than to the one eye; the fourth end is closer to the display unit in comparison with the third end; and a curvature of the second convex surface at the fourth end is larger than a curvature of the second convex surface at the third end.

With the configuration, light from the display unit to the optical unit travels straight while diffusing radially and is incident onto the first convex surface of the transparent base body in the optical unit. The first convex surface corresponds to one surface of a biconvex lens. Accordingly, the incident light becomes collimated so as to travel straight in the transparent base body and reach the second convex surface. The second convex surface and the semi-transmissive layer constitute a half mirror. Accordingly, a part of the collimated light that has reached the second convex surface is transmitted through the half mirror and the other part thereof is reflected by the half mirror. The transmitted light from the half mirror is output from the optical unit and is reflected by the concave mirror. On the concave mirror, the first end is closer to the one eye rather than to the other eye and the second end is closer to the other eye rather than to the one eye. Further, the first end is closer to the display unit in comparison with the second end. Therefore, the reflected light from the concave mirror travels in the first direction which is inclined to the side of the other eye from the traveling direction of the collimated light so as to be guided to the other eye with the first optical system. On the other hand, on the second convex surface of the transparent base body, the third end is closer to the one eye rather than to the other eye and the fourth end is closer to the other eye rather than to the one eye. Further, the fourth end is closer to the display unit in comparison with the third end. Therefore, the reflected light from the half mirror travels in the second direction which is inclined to the side of the one eye from the traveling direction of the collimated light so as to be guided to the one eye with the second optical system. Thus, with the above configuration, an image displayed on one display unit can be split by one half mirror.

Further, the optical unit is formed by integrating the planoconvex lens and the half mirror. Therefore, the planoconvex lens and the half mirror can be easily arranged with high accuracy. Since the light split by the half mirror is collimated, the planoconvex lens and the half mirror do not need to be arranged with high accuracy.

Further, that the light split by the half mirror is collimated indicates that the planoconvex lens and the half mirror can be arranged close to each other. The curvature of the second convex surface at the fourth end is larger than that at the third end. The curvature of the concave mirror at the first end is larger than that at the second end. Therefore, a distance between the display unit and the second end of the concave mirror can be sufficiently shortened.

Therefore, with the aspect of the invention, an HMD which is easily manufactured and is sufficiently reduced in size can be provided. Further, according to the aspect of the invention, the light incident on the transparent base body reaches the half mirror without being output from the transparent base body. Accordingly, light can be prevented from being attenuated.

In the above configuration, it is preferable that the curvature of the concave mirror be gradually increased from the second end to the first end. Further, it is preferable that the curvature of the second convex surface be gradually increased from the third end to the fourth end. In this case, an image can be easily projected with high quality. Further, in the above configuration, it is preferable that each of the first optical system and the second optical system include a plurality of optical units. In this case, various adjustments such as adjustment of an angle of view can be easily made.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
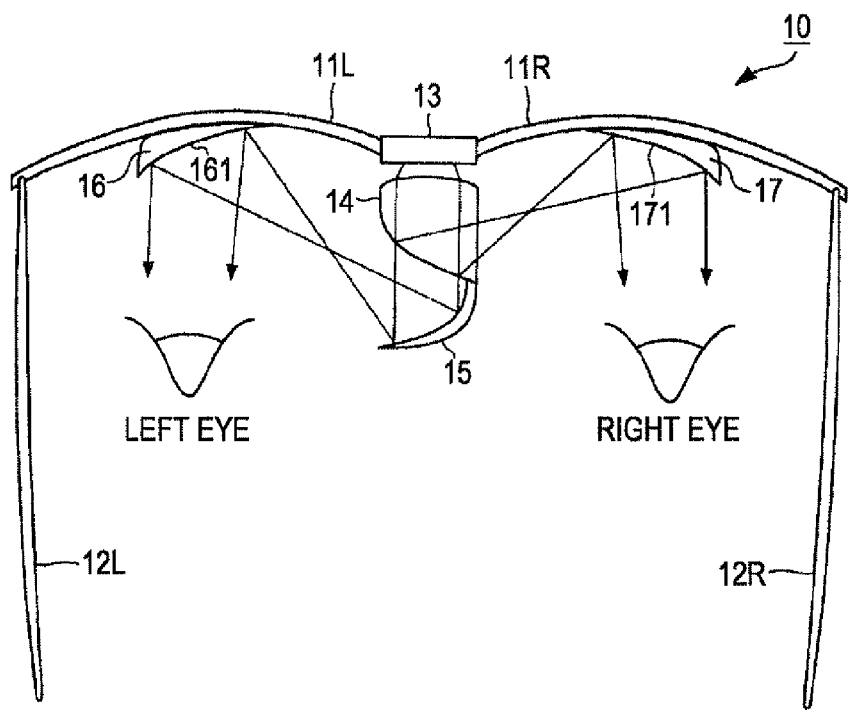
FIG. 1 is a plan view illustrating a configuration of an HMD according to a first embodiment of the invention.

Hereinafter, embodiments of the invention will be described with reference to drawings. It is to be noted that a dimension ratio of each part in the drawings is appropriately made different from an actual dimension ratio thereof. Further, in the drawings, common reference numerals denote common parts.

First Embodiment

FIG. 1 is a plan view illustrating an HMD 10 according to the first embodiment of the invention. The HMD 10 is an eyeglass-shaped display apparatus, which is to be mounted on a person's head. The HMD 10 includes a lens 11L corresponding to the left eye, a lens 11R corresponding to the right eye, a temple portion 12L which rests on the left ear and a temple portion 12R which rests on the right ear. Although the lenses 11L and 11R may be transparent, the lenses 11L and 11R are opaque in this embodiment. The temple portion 12L is attached to the left end of the lens 11L and the temple portion 12R is attached to the right end of the lens 11R.

Further, the HMD 10 includes a plate-shaped display unit 13 between the lens 11L and the lens 11R. The display unit 13 outputs light to the side of the head so as to display an image. The lens 11L is attached to the left end of the display unit 13, and the lens 11R is attached to the right end of the display unit 13. Further, a nose pad (not shown) is attached to the display unit 13. The HMD 10 is mounted on the head by resting the temple portion 12L on the left ear, resting the temple portion 12R on the right ear, and putting the nose pad on the nose.

Further, the HMD 10 includes a concave mirror 15, an optical unit 14, a first optical system 16, and a second optical system 17. The concave mirror 15 has a reflecting surface which is concave. The optical unit 14 is arranged between the display unit 13 and the concave mirror 15. The first optical system 16 is fixed to the lens 11L at the side of the head. The second optical system 17 is fixed to the lens 11R at the side of the head. The optical unit 14 is arranged such that output light from the display unit 13 is incident onto the optical unit 14. The optical unit 14 transmits a part of the incident light and reflects the other part of the incident light. The concave mirror 15 is a total reflection mirror which totally reflects incident light. The concave mirror 15 is arranged such that the transmitted light from the optical unit 14 is incident onto the concave mirror 15. Further, the concave mirror 15 totally reflects the incident light to the side of the first optical system 16. In the embodiment, the traveling direction of the reflected light from the concave mirror 15 is referred to as "first direction" and the traveling direction of the reflected light from the optical unit 14 is referred to as "second direction."

The first optical system 16 is a total reflection mirror having a reflecting surface 161 which is concave. The first optical system 16 has a left end and a right end and totally reflects the incident light so as to guide the reflected light to the left eye. The left end of the first optical system 16 is closer to the left eye in comparison with the right end thereof. The reflecting surface 161 is aspheric and the curvature thereof is gradually increased from the right end to the left end. The second optical system 17 is a total reflection mirror having a reflecting surface 171 which is concave. The second optical system 17 has a left end and a right end and totally reflects incident light so as to guide the reflected light to the right eye. The right end of the second optical system 17 is closer to the right eye in comparison with the left end thereof. The reflecting surface 171 is aspheric and the curvature thereof is gradually increased from the left end to the right end. It is to be noted that when the lenses 11L and 11R are transparent, half mirrors are preferably employed as the first optical system 16 and the second optical system 17.

Figure 2:
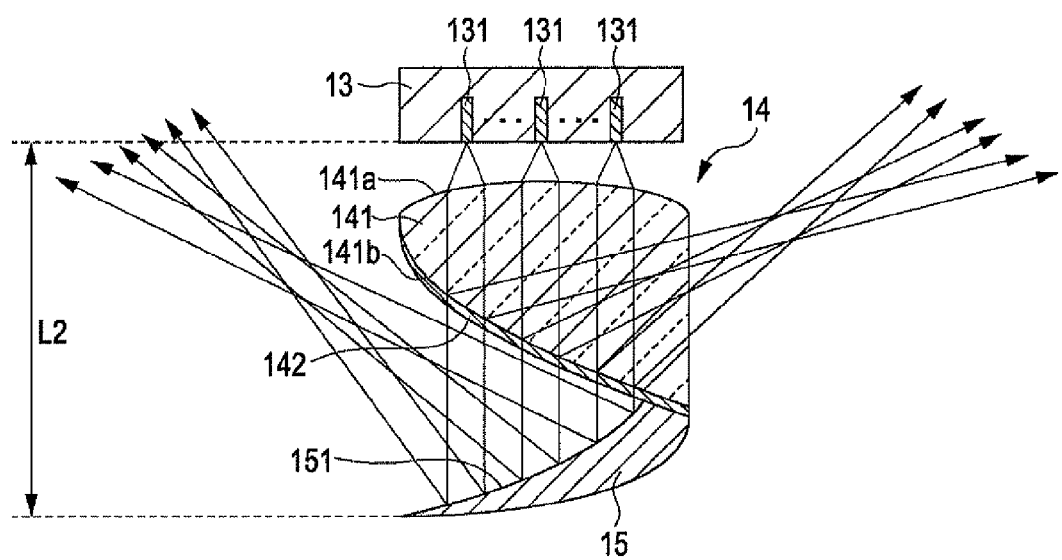
FIG. 2 is a cross-sectional view illustrating a part of the configuration of the HMD.

FIG. 2 is a cross-sectional view illustrating a part of the configuration of the HMD 10. As illustrated in FIG. 2, the display unit 13 includes a plurality of light emitting elements 131 which are arranged in a planar manner. The display unit 13 controls light emission of the light emitting elements 131 so as to display an image. To be more specific, each light emitting element 131 is an organic EL (Electro Luminescent) element and outputs light to the side of the head. It is to be noted that a liquid crystal display device or a digital mirror device which includes a light source may be employed as the display unit 13. That is to say, any electrooptic elements which convert electric energy to light energy can be employed in place of the light emitting elements 131.

The optical unit 14 includes a transparent base body 141 and a semi-transmissive layer 142. The transparent base body 141 is a solid member which is made of a transparent material such as a glass. The transparent base body 141 includes a first convex surface 141a at the side of the display unit 13 and a second convex surface 141b at the side of the concave mirror 15. In other words, the transparent base body 141 is a member in which a space between the first convex surface 141a and the second convex surface 141b is filled with a transparent material. The first convex surface 141a corresponds to one surface of a biconvex lens and is opposed to the display unit 13. An optical axis of the first convex surface 141a is perpendicular to the display unit 13.

The semi-transmissive layer 142 is a metal thin film, for example, and the second convex surface 141b is covered by the semi-transmissive layer 142. That is to say, the second convex surface 141b and the semi-transmissive layer 142 constitute a half mirror which transmits a part of incident light from the display unit 13 and reflects the other part of the incident light from the display unit 13. The second convex surface 141b is aspheric and has a right end (third end) which is closer to the right eye rather than to the left eye and a left end (fourth end) which is closer to the left eye rather than to the right eye. The second convex surface 141b serves as a reflecting surface (concave surface) of the half mirror. The left end (fourth end) of the second convex surface 141b is closer to the display unit 13 in comparison with the right end (third end) thereof. That is to say, a flat surface connecting the left end and the right end of the second convex surface 141b is inclined with respect to a display surface of the display unit 13 such that the left end is closer to the display unit 13 in comparison with the right end. Further, the curvature of the second convex surface 141b corresponds to the curvature of the reflecting surface 171 of the second optical system 17. Namely, the curvature of the second convex surface 141b is gradually increased from the right end (third end) to the left end (fourth end).

The concave mirror 15 is a total reflection mirror. A reflecting surface (concave surface) 151 of the concave mirror 15 is aspheric. The reflecting surface 151 has a right end (first end) which is closer to the right eye rather than to the left eye and a left end (second end) which is closer to the left eye rather than to the right eye. The right end (first end) is closer to the display unit 13 in comparison with the left end (second end). That is to say, a flat surface connecting the left end and the right end of the reflecting surface 151 is inclined with respect to the display surface of the display unit 13 such that the right end is closer to the display unit 13 in comparison with the left end. Further, the curvature of the reflecting surface 151 (curvature of the concave mirror 15) corresponds to the curvature of the reflecting surface 161 of the first optical system 16. Namely, the curvature of the reflecting surface 151 is gradually increased from the left end (second end) to the right end (first end).

Traveling of light in the HMD 10 is described as follows.

Each of output lights from the light emitting elements 131 travels straight while diffusing in radially and is incident onto the first convex surface 141a. Each of the incident lights becomes collimated so as to travel in the transparent base body 141 and reach the second convex surface 141b. Each of the collimated lights which have reached the second convex surface 141b is split into transmitted light and reflected light traveling in the second direction by the half mirror constituted by the second convex surface 141b and the semi-transmissive layer 142. Each of the reflected lights travels in the transparent base body 141, and then, is output from the transparent base body 141. Each of the output lights is incident onto the second optical system 17 and is reflected by the reflecting surface 171 so as to reach the right eye. On the other hand, each of the transmitted lights is output from the optical unit 14 and travels in the first direction. Then, the light is incident onto the first optical system 16 and is reflected by the reflecting surface 161 so as to reach the left eye. In such a manner, the image displayed on the display unit 13 is projected for the left and right eyes.

As is clear from the above description, the optical unit 14 is formed by integrating a planoconvex lens and a half mirror. Therefore, the planoconvex lens and the half mirror are easily arranged with high accuracy. That is to say, the HMD 10 is easily manufactured. It is to be noted that in the HMD 10, the collimated lights output from the planoconvex lens are incident onto the half mirror of the optical unit 14. Therefore, even if accuracy of the arrangement of the planoconvex lens and the half mirror is low, an image with sufficiently high quality can be projected. That is to say, the planoconvex lens and the half mirror do not need to be arranged with high accuracy.

Further, in the HMD 10, lights split by the half mirror are collimated. Therefore, a distance between display unit 13 and the half mirror can be shortened in comparison with a configuration in which a biconvex lens is arranged between the display unit 13 and the half mirror. That is to say, a distance between the display unit 13 and the left end (second end) of the reflecting surface 151 can be shortened. The configuration in which the reflecting surface of the half mirror is the second convex surface 141b and the reflecting surface of the concave mirror 15 is the reflecting surface 151 also contributes to the shortening of the distance between the display unit 13 and the left end (second end) of the reflecting surface 151. This point will be described by comparing with a comparative example.

Figure 3:
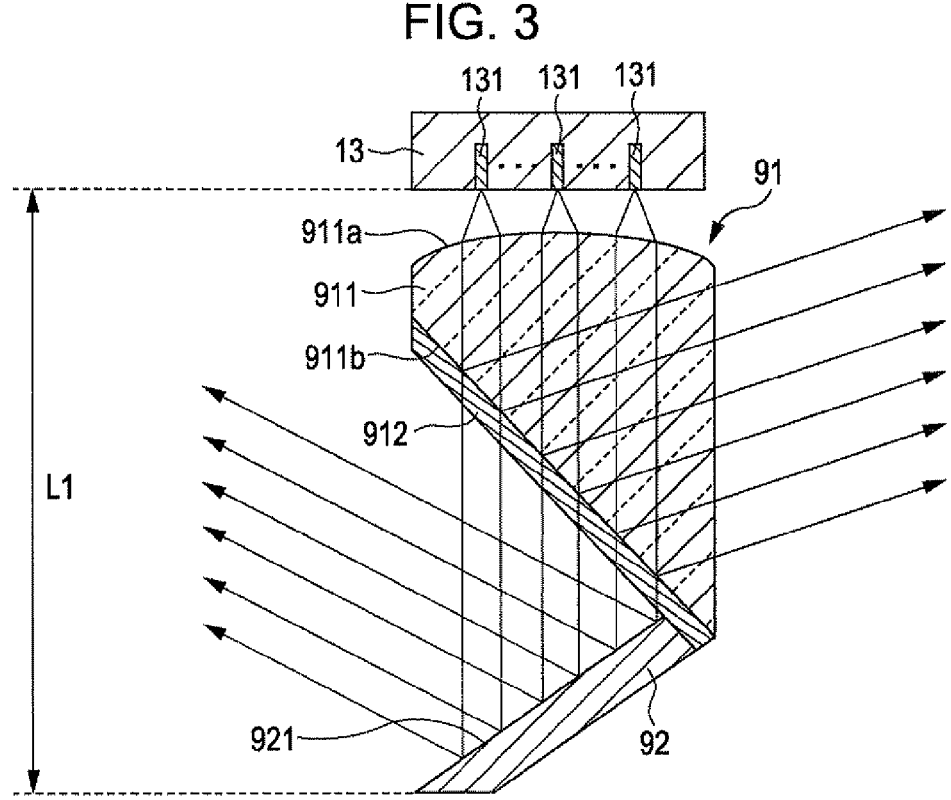
FIG. 3 is a cross-sectional view illustrating a part of a configuration of a comparative example which is compared with the HMD.

FIG. 3 is a cross-sectional view illustrating a part of a configuration of a comparative example which is compared with the HMD 10. As illustrated in FIG. 3, the comparative example includes an optical unit 91 in place of the optical unit 14 and a flat mirror 92 in place of the concave mirror 15. The optical unit 91 includes a transparent base body 911 and a semi-transmissive layer 912. The transparent base body 911 has a convex surface 911a having the same shape as that of the first convex surface 141a at the side of the display unit 13 and a flat surface 911b at the side of the flat mirror 92 in place of the second convex surface 141b. The flat surface 911b is covered by the semi-transmissive layer 912. The flat surface 911b and the semi-transmissive layer 912 constitute a half mirror. On the other hand, the reflecting surface 921 of the flat mirror 92 is flat. It is to be noted that although not shown in the drawing, both of a third optical system corresponding to the first optical system 16 and a fourth optical system corresponding to the second optical system 17 are total reflection mirrors each having a reflecting surface which is flat.

Note that in order to make reflected lights from the half mirror be incident onto the reflecting surface of the second optical system with no leakage, there are the following requirements. That is, it is necessary that an inclination of the reflecting surface of the half mirror with respect to the display surface of the display unit 13 be sufficiently ensured and a distance between the display unit 13 and the reflecting surface of the half mirror be made sufficiently long. In the same manner, in order to make reflected lights from the concave mirror 15 (flat mirror 92) be incident onto the reflecting surface of the first optical system with no leakage, there are the following requirements. That is, it is necessary that an inclination of the reflecting surface of the concave mirror 15 (flat mirror 92) with respect to the display surface of the display unit 13 be sufficiently ensured and a distance between the display unit 13 and the reflecting surface of the concave mirror 15 (flat mirror 92) be made sufficiently long.

In the comparative example, the reflected lights from the half mirror and the reflected lights from the flat mirror 92 are collimated. On the other hand, in the HMD 10, the reflected lights from the half mirror and the reflected lights from the concave mirror 15 are focused. Accordingly, the above inclination to be ensured in the HMD 10 is smaller than the above inclination to be ensured in the comparative example. Further, the above distance to be ensured in the HMD 10 is shorter than the above distance to be ensured in the comparative example. A distance between the display unit 13 and a far end of the reflecting surface 921 in the comparative example is assumed to a distance L1 and a distance between the display unit 13 and a far end of the reflecting surface 151 in the HMD 10 is assumed to a distance L2. That is, relationship of L1>L2 is satisfied.

Further, in the HMD 10, the configuration in which the curvature of the second convex surface 141b is gradually increased from the right end (third end) to the left end (fourth end) and the curvature of the reflecting surface 151 is gradually increased from the left end (second end) to the right end (first end) also contributes to the shortening of the distance between the display unit 13 and the left end (second end) of the reflecting surface 151. This is because the above inclination to be ensured is smaller and the above distance to be ensured is shorter in comparison with a case in which the curvature of the reflecting surface of the half mirror is uniform.

As described above, it is understood that the HMD 10 is easily manufactured and is sufficiently reduced in size. Further, in the HMD 10, the light incident onto the transparent base body 141 reaches the half mirror without being output from the transparent base body 141. Therefore, the number of interfaces on an optical path is reduced in comparison with a mode in which the planoconvex lens and the half mirror are separately formed. Accordingly, with the HMD 10, light can be prevented from being attenuated.

Second Embodiment

Figure 4:
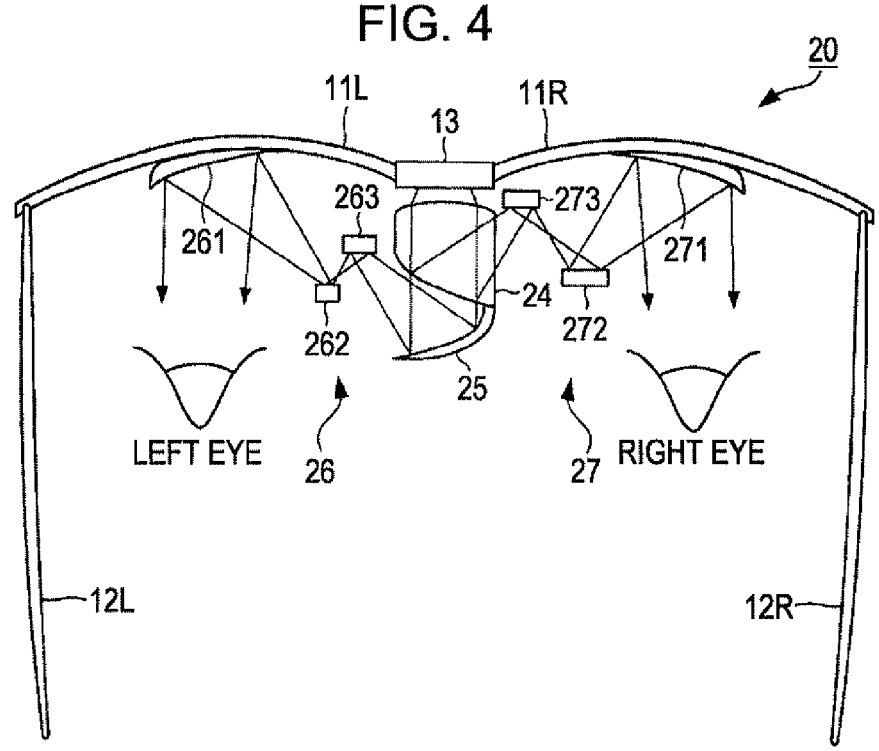
FIG. 4 is a plan view illustrating a configuration of an HMD according to a second embodiment of the invention.

FIG. 4 is a plan view illustrating a configuration of an HMD 20 according to the second embodiment of the invention. The HMD 20 is different from the HMD 10 only in that the HMD 20 includes an optical unit 24, a concave mirror 25, a first optical system 26, and a second optical system 27 in place of the optical unit 14, the concave mirror 15, the first optical system 16, and the second optical system 17. In the embodiment, the traveling direction of reflected light from the concave mirror 25 is referred to as "first direction" and the traveling direction of reflected light from the optical unit 24 is referred to as "second direction."

The first optical system 26 is constituted by a plurality of optical parts. That is to say, the first optical system 26 is constituted by a total reflection mirror 261, a total reflection mirror 262, and a total reflection mirror 263. The total reflection mirror 261 has a reflecting surface which is concave. The total reflection mirror 262 has a reflecting surface which is flat. The total reflection mirror 263 has a reflecting surface which is flat. The total reflection mirror 263 reflects incident light to make the reflected light be incident onto the reflecting surface of the total reflection mirror 262. Then, the total reflection mirror 262 reflects the incident light to make the reflected light be incident onto the reflecting surface of the total reflection mirror 261. Further, the total reflection mirror 261 reflects the incident light to guide the reflected light to the left eye. The reflecting surface of the total reflection mirror 261 is aspheric as in the first optical system 16. The curvature of the reflecting surface of the total reflection mirror 261 is gradually increased from the right end to the left end.

The second optical system 27 is constituted by a plurality of optical parts. That is to say, the second optical system 27 includes a total reflection mirror 271, a total reflection mirror 272, and a total reflection mirror 273. The total reflection mirror 271 has a reflecting surface which is concave. The total reflection mirror 272 has a reflecting surface which is flat. The total reflection mirror 273 has a reflecting surface which is flat. The total reflection mirror 273 reflects incident light to make the reflected light be incident onto the reflecting surface of the total reflection mirror 272. Then, the total reflection mirror 272 reflects the incident light to make the reflected light be incident onto the reflecting surface of the total reflection mirror 271. Further, the total reflection mirror 271 reflects the incident light to guide the reflected light to the right eye. The reflecting surface of the total reflection mirror 271 is aspheric as in the second optical system 17. The curvature of the reflecting surface of the total reflection mirror 271 is gradually increased from the left end to the right end.

The optical unit 24 includes a transparent base body and a semi-transmissive layer as in the optical unit 14. However, the curvature of the second convex surface of the transparent base body in the optical unit 24 corresponds to the curvature of the reflecting surface of the total reflection mirror 271. An inclination of the second convex surface of the transparent base body with respect to the display surface of the display unit 13 in the optical unit 24 is smaller than that in the optical unit 14. A distance between the display unit 13 and the second convex surface of the transparent base body in the optical unit 24 is longer than that in the optical unit 14. In the same manner, the curvature of the reflecting surface of the concave mirror 25 corresponds to the curvature of the reflecting surface of the total reflection mirror 261. An inclination of the reflecting surface with respect to the display surface of the display unit 13 in the concave mirror 25 is smaller than that in concave mirror 15. A distance between the display unit 13 and the reflecting surface in the concave mirror 25 is longer than that in the concave mirror 15.

Traveling of light in the HMD 20 is described as follows.

Each of output lights from the light emitting elements 131 travels straight while diffusing radially and is incident onto the first convex surface of the transparent base body in the optical unit 24. Each of the incident lights becomes collimated so as to travel in the transparent base body and reach the second convex surface of the transparent base body. Each of the collimated lights which have reached the second convex surface is split into transmitted light and reflected light from the half mirror constituted by the second convex surface and the semi-transmissive layer. Each of the reflected lights travels in the transparent base body, and then, is output from the transparent base body. Each of the output lights is reflected by the total reflection mirror 273, reflected by the total reflection mirror 272, and reflected by the total reflection mirror 271 so as to reach the right eye. On the other hand, each of the transmitted lights is output from the optical unit 24, reflected by the total reflection mirror 263, reflected by the total reflection mirror 262, and reflected by the total reflection mirror 261 so as to reach the left eye.

Therefore, according to the second embodiment, the same effects as those in the first embodiment can be obtained. Further, in the second embodiment, each of the first optical system 26 and the second optical system 27 is constituted by a plurality of optical parts. Therefore, various adjustments such as adjustment of an angle of view and adjustment of a screen size can be easily made. Further, according to the second embodiment, inclinations of the reflected lights from the half mirror and the reflected lights from the concave mirror in the traveling direction with respect to the traveling direction of the collimated lights can be made smaller than those in the first embodiment. This is advantageous from a viewpoint that an image with high quality is projected.

Third Embodiment

Figure 5:
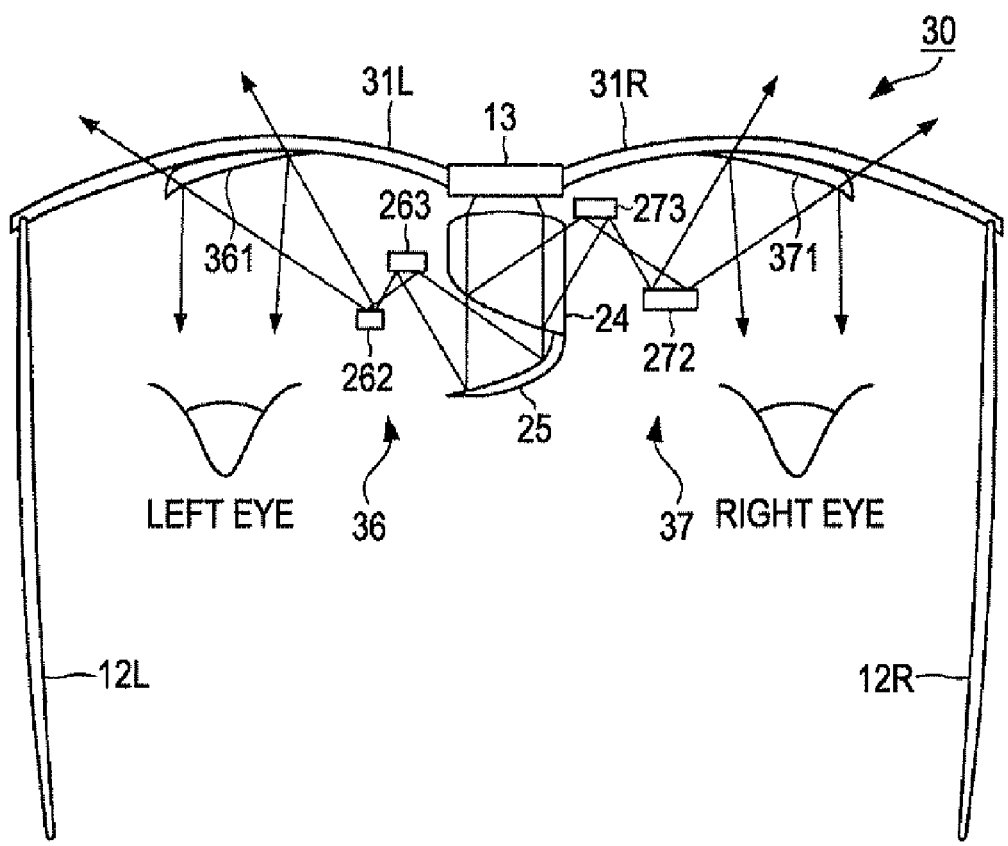
FIG. 5 is a plan view illustrating a configuration of an HMD according to a third embodiment of the invention.

FIG. 5 is a plan view illustrating a configuration of an HMD 30 according to the third embodiment of the invention. The HMD 30 is different from the HMD 20 only in that the HMD 30 includes lenses 31L and 31R, a first optical system 36, and a second optical system 37 in place of the lenses 11L and 11R, the first optical system 26, and the second optical system 27.

The lenses 11L and 11R are transparent. For example, the lenses 11L and 11R are formed with glasses. The first optical system 36 is different from the first optical system 26 only in that the first optical system 36 includes a half mirror 361 having the same shape and the same size as those of the total reflection mirror 261 in place of the total reflection mirror 261. The second optical system 37 is different from the second optical system 27 only in that the second optical system 37 includes a half mirror 371 having the same shape and the same size as those of the total reflection mirror 271 in place of the total reflection mirror 271.

That is to say, the HMD 30 is a so-called see-through type HMD. Accordingly, a person who wears the HMD 30 can see an image displayed on the display unit 13 while superimposing the image on scenery in the outside world. It is to be noted that according to the third embodiment, the same effects as those in the second embodiment can be obtained.

Variations

The invention is not limited to the above embodiments and various variations which are obtained by varying the above embodiments are encompassed in the invention. An example of such variations is described as follows.

In the above embodiments, a surface of which the curvature is gradually increased from one end to the other end is employed as the aspheric surface. However, any surface of which the curvature of one end is larger than the curvature of the other end may be employed. However, in this case, in order to project an image with high quality, arrangement with high accuracy is required in some case. In other words, according to the above embodiments, an image with high quality can be projected without requiring arrangement with high accuracy.

This application claims priority from Japanese Patent Application No. 2010-119041 filed in the Japanese Patent Office on May 25, 2010, the entire disclosure of which is hereby incorporated by reference in its entirely.

What is claimed is:

1. A head mounted display comprising:
a display unit that displays an image;
a concave mirror that has a first end which is closer to one eye rather than to the other eye and a second end which is closer to the other eye rather than to the one eye;
an optical unit that is arranged between the display unit and the concave mirror, and transmits a part of incident light from the display unit and reflects the other part of the incident light from the display unit;
a first optical system that guides light reflected by the concave mirror to the other eye; and
a second optical system that guides light reflected by the optical unit to the one eye,
wherein the first end is closer to the display unit in comparison with the second end,
a curvature of the concave mirror at the first end is larger than a curvature of the concave mirror at the second end,
the optical unit includes:
a transparent base body that has a first convex surface at the side of the display unit and a second convex surface at the side of the concave mirror, and
a semi-transmissive layer that covers the second convex surface,
the second convex surface has a third end which is closer to the one eye rather than to the other eye and a fourth end which is closer to the other eye rather than to the one eye,
the fourth end is closer to the display unit in comparison with the third end, and
a curvature of the second convex surface at the fourth end is larger than a curvature of the second convex surface at the third end.

2. The head mounted display according to claim 1, wherein a curvature of the concave mirror is gradually increased from the second end to the first end, and
a curvature of the second convex surface is gradually increased from the third end to the fourth end.

3. The head mounted display according to claim 1, wherein each of the first optical system and the second optical system includes a plurality of optical parts.

* * * * *